May 13, 1969 J. C. NEEDHAM 3,444,430
ELECTRIC ARC STABILISATION
Filed May 2, 1966 Sheet _1_ of 3

Inventor
James C. Needham
By Kenon Palmer
Stewart & Estabrook
Attorneys 3,444,430
ELECTRIC ARC STABILISATION
James C. Needham, Cambridge, England, assignor to The Welding Institute, London, England, a body corporate of Great Britain
Filed May 2, 1966, Ser. No. 547,028
Claims priority, application Great Britain, May 4, 1965, 18,749/65
Int. Cl. B23k 9/10; H05b 7/18
U.S. Cl. 315—171                               9 Claims

ABSTRACT OF THE DISCLOSURE

A direct current welding arrangement is disclosed in which the arc is supplied by a principal and a supplementary power source. The principal source has a waveform which does not fall cyclically to zero and which provides the major part of the arc current. The supplementary source has an output voltage which is greater than the principal source and a short circuit current output which is not greater than 50% of that of the principal source. A rectifier is connected in series with the principal source across the arc and the supplementary source is connected in parallel with the rectifier-source series combination to prevent current flow from the supplementary source through the principal source.

---

This invention relates to the provision of power sources for welding arcs.

Frequently the characteristics of a power source capable of achieving optimum welding conditions are different for different stages of a welding operation. For example, in order to give a reasonable degree of self-adjustment of the arc it is necessary for the power source to have a relatively flat output characteristic with its open circuit voltage of the same order as that of the operating arc. If no short circuiting occurs, or other events causing greater current to flow from time to time, then the open circuit voltage of the source must exceed by a few volts the operating voltage of the arc whether the source is mainly resistive in impedance or not, but in a short circuiting system the open circuit voltage of the source can be a few volts less than the arc burning voltage if the source has an appreciable inductance as long as the open circuit voltage exceeds by a few volts the mean operating voltage of the arc, composed of both the arcing and short circuit voltage levels. In this specification the term "open circuit voltage" should be understood as being broad enough to cover situations where the output characteristic of the power source is not linear and can be defined as the voltage given by projecting back to zero current a line through the operating point on the output characteristic with a slope equal to the slope of the characteristic at that point. However, the provision of a power source with a flat output characteristic of relatively low voltage such as is necessary to provide reasonable degree of self-adjustment can be incompatible with conditions required for the maintenance of stability. For an arc operating from a direct current source, the stability is not readily defined and the existence of instabilities are only registered by momentary excess arc voltage over an average level or, in the extreme, by extinction of the arc. The necessary condition for stability is that at all instants the voltage and current requirements of the arc must be provided by the power source available. The normal approach for improving stability is to increase the open circuit voltage of the power source above the normal arc burning voltage so that a reserve of voltage is available when demanded by some irregularity in the operation of the arc. Such irregularities may be caused for example, by movements of the operator in manual or semi-automatic welding or by changes in the ionization in the arc column or in the vicinity of the arc roots due to a fluctuation in the arc temperature or in the chemistry of the electrodes, or such irregularities may be due to a change in the physics of the arc root mechanism. In all cases the deleterious change is reflected as an increase in the voltage demanded by the arc at the current level concerned and if this voltage exceeds the available voltage from the supply, including any back E.M.F. due to rate of change of current in inductive elements, then the arc extinguishes.

According to the present invention, the D.C. arc is supplied by a compound power source including a principal power source and a supplementary power source; the principal power source has an output which does not fall cyclically to zero, which provides the major part of the arc current and which has an open circuit voltage of the same order of the arc voltage, thereby permitting self-adjusting operation of the arc; the supplementary power source has an output voltage greater than that of the principal power source and a short circuit current output not greater than 50% of that of the principal power source. In addition, a rectifier is connected in series with the principal power source across the arc and the series-connected rectifier and principal source are connected in parallel with the supplementary power source. The rectifier prevents current flow from the supplementary power source through the principal power source.

In this way it is arranged that, depending on the nature of the supplementary power source, increased voltage is available in response to the need of the arc to prevent extinction of the arc owing to transient irregularities. Thus, the characteristic of the principal supply may be selected solely with a view to achieving efficient arc operation under normal conditions, for example achieving effective self-adjusting operation.

In certain circumstances, it is advantageous to provide more than one supplementary power source in addition to the principal power source. A first supplementary power source for reducing the possibility of arc failure due to the inability of the principal power source to meet increased voltage demands of the arc preferably has an open circuit voltage which is at least twice the open circuit voltage of the principal power source (which in the case of a self-adjusting arc would be of the same order as the operating voltage of the arc) but the maximum current output of the supplementary high voltage source would be not more than 50% of the mean operating current of the arc. A rectifier arranged in series with the principal power source would serve to isolate the principal power source from the supplementary power source when the arc demands a voltage which is higher than the open circuit voltage of the principal power source so that, in the event of instability displayed by a demand of the arc for a higher voltage than the open circuit voltage of the principal supply, the arc is maintained at a reduced current by the supplementary high voltage source alone. Under normal arc operating conditions, however, the open circuit voltage of the principal power source is such that it is sufficient to supply the arc with current and the comparatively low current output of the supplementary high voltage source ensures that the arc is supplied almost exclusively by the principal power source. The upper limit for the current output of a suitable supplementary high voltage source has been stated to be 50% of the mean arc operating current but it is frequently convenient that it should be substantially less than this value, though for effective results it should not be less than the 5% of the mean arc operating current or 1 amp whichever of these two values is the greater.

In addition to this first supplementary power source, a second supplementary power source may be provided having an open circuit voltage which is low compared with that of the principal supply but having a low impedance and a materially higher current output than the principal supply on short circuit. Rectifier means are provided in series with the supplementary low voltage high current source to isolate that source from the principal power source except when the arc is short circuited and demands an increased current supply in order to be cleared. Preferably the short circuit current output of such a supplementary low voltage source would be at least three times the value of the average arc current or greater than 1000 amps which value is the greater and its open circuit voltage would be less than two-thirds of that of the principal power source.

Compound power sources embodying the present invention are useful not only in systems where the arc is normally supplied with a relatively steady current source but also in connection with D.C. pulsed current arc designed to provide, for example, improved control of metal transfer during consumable electrode welding or cyclic modulation of the heat input. In such pulsed current welding the current supplied to the arc is switched cyclically between a background level and at least one higher level. As described in my U.S. application No. 298,223 of July 29, 1963, now Patent No. 3,249,735 in controlled transfer welding the background level is sufficient to melt the electrode tip but insufficient to produce natural, non-gravitational, transfer during the periods for which it is effective while the higher level serves to produce transfer of the electrode material during the periods for which the higher level is effective. We have observed that the operating current of the arc tends to fall to an abnormally low value when the arc current is switched from its higher level to the background level. This may be due to a variety of causes such as interaction between the source providing the higher current level and the source providing background current which results mainly from the effect of the higher level current pulse on the instantaneous arc voltage. Also it might be caused by a change in arc behaviour or possibly an increase in arc length resulting from the transfer of molten metal from the electrode through the arc to the workpiece in consumable electrode welding. This phenomenon of current reduction is particularly troublesome where there is a large difference between the current at its higher level and the background current and under such circumstances may cause the arc to be extinguished. A compound power source embodying the present invention including, in addition to the principal sources for providing the background current and higher current for normal pulsed operation, a supplementary power source having a high open circuit voltage but low current output is beneficial in that it serves to provide an increased operating voltage at the demand of the arc thus greatly reducing the tendency of the arc to be extinguished. A convenient open circuit voltage for such a supplementary source would, for example, lie between 50 and 100 volts and the current output would be of the order of 10 to 20 amps.

Where the most likely instant of instability of a welding arc may be predicted, such as in the pulsed current welding system described, the supplementary source may be arranged to be operative over the periods of expected instability and thus may be itself in the form of a pulsed current source rather than a source of constant voltage. A minimum duration for current pulses of such a source would be one millisecond and the pulses would be synchronised to coincide with the trailing edges of the higher level pulses of the principal source. Rectifier means would prevent interference between the supplementary and principal sources and the supplementary high voltage source would merely supply a low additional current to the arc unless the arc showed a tendency to fail or fall to an abnormally low value of current, whereupon the supplementary high voltage source would take over the function of current supply to the arc at a high voltage but reduced current level until the effect of the transient conditions ceased and operation by the principal source resumed at the normal background level. Thus, even though the supplementary source provides pulses at predetermined intervals, the arrangement is such that the supplementary high voltage source only takes over control of the arc during periods determined by the instantaneous operating conditions of the arc itself.

In order that the invention may be more clearly understood, several specific examples embodying it will now be described with reference to the accompanying drawings, in which.

Figure 5A:
Figure 5B:
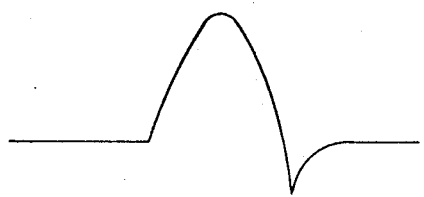
Figure 6:
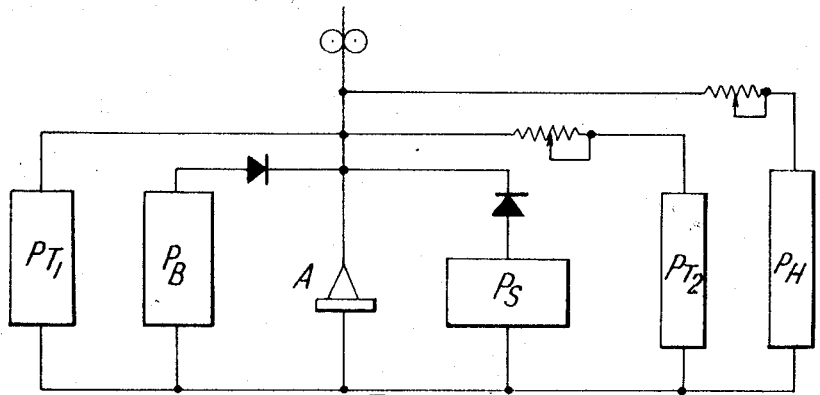

FIGURE 5 shows waveform diagrams of current variations in a controlled transfer system in which a substantially sinusoidal half wave pulse is superimposed upon a constant background supply, FIGURE 6a showing the theoretically predicted current variation and FIGURE 6b showing the distorted waveform found actually to occur in conventional practice; and FIGURE 6 shows a controlled transfer system having a compound power source including principal sources of background and pulsed current and supplementary pulse sources of high voltage low current and steady potential sources of low voltage high current and high voltage low current.

Figure 1:
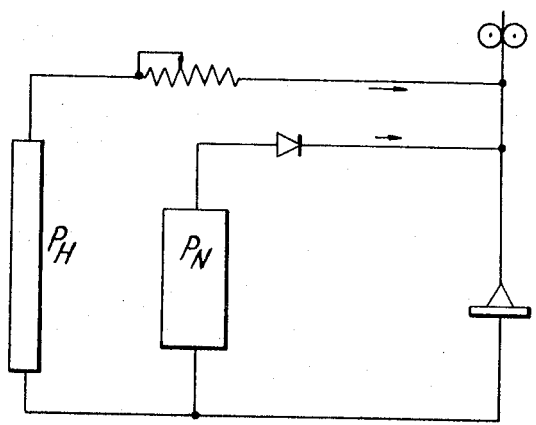
FIGURE 1 shows a consumable electrode system having a compound power source including a principal source of current together with a supplementary high voltage source.

In FIGURE 1 a consumable electrode arc such as aluminium in argon is operated at about 250 amps and 23 volts from a nominally "flat" characteristic principal source PN with an open circuit voltage of say, 26 volts and a supplementary source PH is provided of, say, 50–100 volts open circuit voltage but of limited current, for example 15 amps at the normal arc burning voltage. The principal lower voltage source PN is fed to the arc through a diode so that the principal lower voltage source is isolated from the system when the arc requires a voltage higher than that available from this source. Without such a rectifier the principal lower voltage source would always been seen from the point of view of the arc in parallel with and by-passing the supplementary higher voltage source, and the arc would not experience the benefits of the higher open circuit voltage that would otherwise be available. The arc normally draws its main power from the principal lower voltage source PN as in conventional welding practice but, in the event of any instability requiring a higher arc voltage, the arc does not extinguish but continues to burn, albeit at a reduced current, with the stability offered by the high open circuit voltage supplementary source PH alone, until the period of instability is passed. The arc then reverts to its normal voltage level, where the arc again draws its main power from the principal lower voltage source PN.

Figure 2:
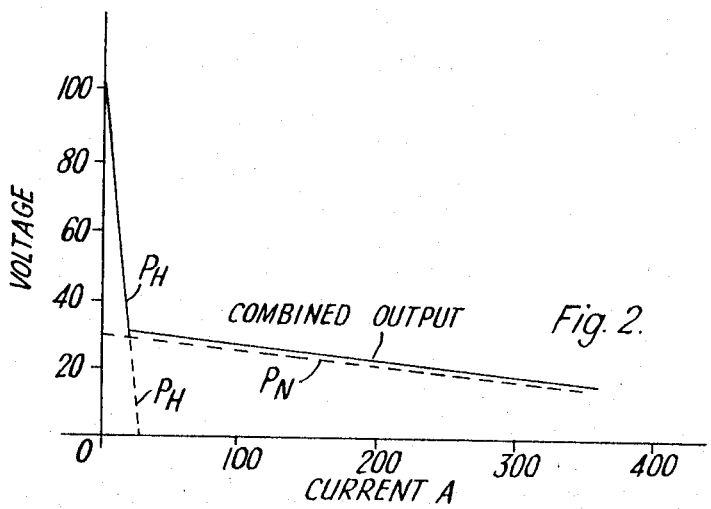
FIGURE 2 is a graph illustrating the variations of voltage output with current of the compound power source of FIGURE 1.

The overall output voltage-current characteristic from a compound supply with a separating rectifier such as is shown in FIGURE 1 is illustrated in FIGURE 2. At output voltages above the open circuit voltage of the lower voltage principal source alone, the characteristic is that of the supplementary higher voltage limited current source PH. However, at outputs below the open circuit voltage of the principal source, the output current, shown by a continuous line in FIGURE 2, is the sum of the individual contributions of the two sources, that from the principal source PN being predominant as shown by the broken line in FIGURE 2. Thus in practice the higher voltage supplementary source has a relatively small influence on the total output in this normal working range, as its current contribution is small, but at higher voltages (representative of instability) the output characteristic becomes that of the higher voltage supplementary source alone.

Figure 3:
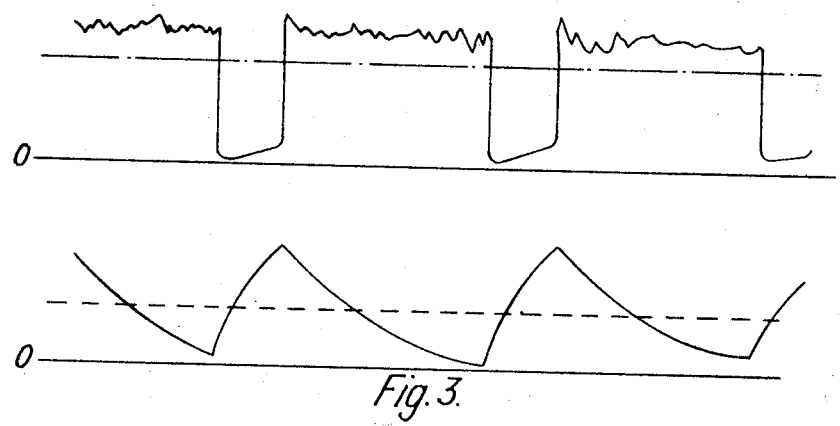
FIGURE 3 shows the variations of arc voltage and arc current with time in a conventional short circuiting arc system.

In consumable electrode welding operating with a short circuiting arc, employing for example a steel wire electrode and $CO_2$ gas shield, in which the melting tip touches the work or weld pool and metal from the electrode is transferred directly by the recurring short circuits, it is generally necessary to use a low open circuit voltage source in order to satisfy the requirements of self adjustment, but the arc tends to be unstable and can extinguish particularly following the rupture of the short circuits when a new arc has to be established. It is the known practice to add appreciable circuit inductance or to use an inductive source such as a motor generator, in order to provide sufficient extra arc voltage to maintain the arc in between the short circuit periods, especially when the nominal open circuit voltage of the power source is actually less than the real burning arc voltage level. In this way, it is attempted to provide a power supply which anticipates the probable demands of the arc. For example a source with an open circuit voltage of 25 volts can be used for an arc of *average* voltage of 20 volts but this reeading is composed of short circuit voltages of a few volts only and arcing levels around 30 volts. The latter stage is characterised by a rapidly falling current during the arcing period. Typical oscillograms of arc voltage and arc current for such an inductive system are shown in FIGURE 3. In the upper diagram the open circuit voltage of the source is indicated by a chain dot line and the arc voltage by a continuous line switching between a higher arcing voltage level and a much lower short circuit voltage level. The lower diagram shows the average arc current as a broken line and the arc current, which rises during the periods of short circuit and falls during the arcing periods, as a continuous line. The necessary voltage in excess of the open circuit voltage of the power source is provided by the back E.M.F. induced in the inductive parts of the power supply circuit. The arc, without a supplementary high voltage source is particularly prone to extinguish both at the instant following the rupture of the short circuit, and towards the end of the arcing period between short circuits when the current has fallen well below the average value. By providing, in a system embodying the present invention, a supplementary source of high open circuit voltage but limited current, the stability of the arc is improved and the short circuiting arc system can be made to operate in such a manner that in each arcing period, due to the limited current supply of the supplementary, comparatively high, voltage source, the consumable electrode feed overtakes the burn-off associated with the arc and a short circuit inevitably occurs. Conversely this short is then cleared by the high current from the lower voltage principal power source so that an arc is formed and the cycle of events repeated. Thus the characteristics of the principal power source (and its inductance if present) may be selected with a view to optimising short circuit performance, and say the spatter associated with the disruption of the short circuits, without having to compromise on the stability of the arc.

Figure 4:
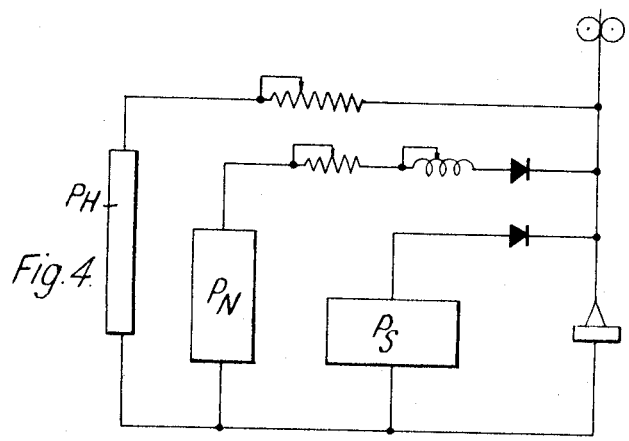
FIGURE 4 shows a short circuiting arc system including, in addition to a principal power source, both a high voltage low current supplementary source and a low voltage high current source to reduce respectively instabilities due to momentary excess voltage demands by the arc and to failure to re-establish the arc after shorting out.

FIGURE 4 illustrates a compound triple source system in which the principal source PN, having an open circuit voltage of 20 to 30 volts is backed by a limited current supplementary source PH of appreciably higher open circuit voltage (about 100 v., for example) to give arc stability without interfering with the self-adjustment of the principal source PN. FIGURE 4 further includes a further supplementary power source PS for overcoming the tendency in short circuiting arc operation of the arc to extinguish by shorting out and not be re-established as the short circuit is not cleared. The further supplementary short circuit current source PS is isolated from the principal source PN by means of a rectifying device. When the arc is shortcircuited the current can flow both from the principal power source PN and the low voltage "short circuit" source PS; but when an arc is formed, and particularly when the arc burning voltage is greater than the open circuit voltage of the supplementary current source PS, the main current is drawn from the principal source PN. Thus, in place of the conventional arrangement for short circuit transfer welding, in which a nominally flat characteristic power source of open circuit voltage near to or even less than the arc burning voltage is used together with a large series inductance which serves to control the rate of change of current on short circuit (and to aid arc stability following each short), a further supplementary low voltage source, with an open circuit voltage between that of the short circuit and the arc burning voltage, which mainly serves to provide current to fuse or interrupt the short circuit, is included. The low voltage supplementary source PS is of low impedance, typically of the order of 0.01 ohm, while the impedance of the principal higher voltage source PN depends on the operating current desired and the voltage difference between this source and the arc. If the voltage difference is low then the effective resistive impedance is typically of the order of 0.1 ohm with, if necessary, a small inductance say 0.1 mh. to aid arc stability in this instance. (The normal inductance which is iron cored, used to control the rate of change of current in conventional systems with short circuit transfer is of the order of 1 to 3 mh. at 100 a.) The use of an inductance associated with the principal power source enables the principal source itself to provide comparatively high short circuit current for short periods and in such a case a supplementary source supplying a short circuit current equal to at least twice the short circuit current of the principal source for a period of up to 10 milliseconds might be adequate. For example, if the arc has an operating voltage of 25 v. and the principal power source PN an open circuit voltage of 30 v., an inductance of .1 mh. and a resistance of .1 ohm could be connected in series with the principal source. A suitable value for the open circuit voltage of the supplementary short circuit power source would be between 10 v. and 15 v.

The supplementary high voltage source PH has the greatest series impedance to limit the maximum current available to say 20 a. The main arc current is drawn from the principal source PN which can be nominally flat (i.e. having an open circuit voltage only slightly different from that of the arc burning voltage). This principal source PN can be of lower voltage than the arc burning voltage provided an appreciable inductance is added in series with it, as in present practice, to provide the necessary voltage difference to run the arc. Alternatively the principal source can have an effective open circuit voltage somewhat greater than that of the arc, by say, 10 v., with a series impedance to provide the required voltage drop. In all cases the first supplementary high voltage source provides for any excess voltage demands by the arc to ensure arc stability and the second supplementary low voltage source of low impedance serves to provide sufficient current on short circuit to clear such shorts and prevent the arc from being permanently shorted out.

The several systems described can be applied to consumable electrode arcs as used in welding and cutting and systems as hown in FIGURE 1, for example, could be used with a non-consumable electrode. Thus in tungsten arc welding and cutting (with the tungsten connected usually to the negative pole of the combined supply) the arc can draw its main current from the source with a potential near that of the arc. This is normally not practicable since the arc is too unstable, but with a high voltage supplementary source forming a stabilising arrangement adequate stability is provided. In addition it is possible to vary the current in the arc merely by changing the arc length. Thus at longer spacings where the arc voltage exceeds that of the principal high current supply the current falls to a low value determined by the higher voltage supplementary source PH. However, by reducing the spacing and hence the arc voltage, the operating point moves along the characteristic of FIGURE 2 into the range where the high current supply provides current. By suitable adjustment of the two sources (or by a multiplicity of sources) the arc current can be made to vary merely by changing the electrode to work separation. With such systems, the operator can shorten the arc gap if greater current or deeper penetration desired, and conversely can reduce current as required, for example, at the end of a welding operation by increasing the gap. This arrangement can thus be used to compensate for variations in weld geometry and, for example to provide automatic "crater fill" where the current is reduced to avoid crater depressions at the end of welding.

The principle on which the present invention is based of building up of compound power sources to enable varying arc conditions to be met, can be extended by providing further sources of different open circuit voltages such that a wide spectrum of voltage current relationship is effectively provided with different settings of the power sources. For example, the principal power source PN in FIGURE 5 may itself be replaced by two or more sources having different open circuit voltages, the sources with the higher open circuit voltages having greater circuit impedances compared with the sources having lower open circuit voltages and the sources being isolated from one another by series diodes, as described in connection with FIGURE 4. A convenient source could comprise a transformer with a number of different output terminals each supplying power to the arc through one of a bank of rectifiers.

In each of the systems described above, each source is one of direct current and can for example comprise a simple battery bank, generator or transformer rectifier. In each system the various sources of potential must be separated from each source of lower potential by means of a rectifying device to prevent the lower voltage source from shunting the higher sources and taking current from such higher sources. If the lower potential sources comprise a transformer rectifier supply then an additional rectifier in the system is not required, the rectifier of the transformer set providing the necessary isolation.

The principle on which the present invention is based of providing a compound power source to supply exceptional voltage or current demands of the arc has a further important application in connection with pulsed current arcs in which the operating current is made to fluctuate cyclically between a background level and a higher level. A common pulsed source supplies arc current which consists of a relatively steady background current superimposed with sinusoidal half loops of current which repeat at the frequency of mains supply or simple multiples or sub-multiples of this frequency. The arc current theoretically supplied by such a source is shown in FIGURE 5a but in practice we have found that the operating current tends to fall to an abnormally low value at the end of the sinusoidal pulse period as shown diagrammatically in FIGURE 5b. This problem may be overcome in a system embodying the present invention by providing a compound power source including not only the source of background current and a source of pulsed current together forming a principal power source but also a supplementary source having an open circuit voltage in excess of the peak amplitude of the pulsed source but supplying comparatively limited current of the order of 10 to 20 amps. Such a high voltage source is effective when the arc current falls below the background level and thus reduces the tendency of the arc to extinguish at the end of the pulses of its principal source.

Since the probable moments of instability can be predicted in such a case, a supplementary source providing a steady D.C. voltage may be replaced by a supplementary source supplying a further pulsed voltage, provided the supplementary pulses have the high voltage low current characteristics necessary to achieve a stabilising effect and they are effective for the periods in each cycle where the need for stabilisation is anticipated. In order to ensure that the stabilising influence is available when required it is necessary that the duration of the stabilising pulses should be at least one millisecond.

A compound source for a pulsed current welding system is shown in FIGURE 6 in which the principal source includes a first source PB of background current together with a second source PT1 for supplying half wave pulses to superimpose background current. A supplementary stabilising source PT2 supplies further pulses which lag the pulses supplied by source PT1 so that they overlap the trailing edge of the pulses from the pulse source PT1 of the principal source. Conveniently, the source PT1 may supply single polarity pulses of the order of 30 to 40 R.M.S. open circuit with a peak current to say 300 to 500 amps. being one phase derived from a three phase supply while the single polarity pulses from the stabilising pulse source PT2 may be of the order of 70 volts open circuit and 40 amps. peak current and derived via rectifiers from the same three phase supply as the pulses of the principal signal but phase shifted with respect to the pulses of the source PT1 by 60 degrees or 90 degrees. In such an arrangement the pulses of the supplementary stabilising source are present for a period of the order of half a cycle of the mains supply frequency and are arranged to occur at the same repeat frequency as the pulses from the principal source and to be present over the fraction of the cycle of principal source when instability is most likely to occur, that is to overlap the trailing edges of the pulses from the principal source.

In FIGURE 6 further supplementary sources PS and PH are shown in parallel with supplementary source PT2. These sources are, respectively, a low voltage high current source and a high voltage limited current source and fulfill exactly the same function as the supplementary sources PS and PH shown in FIGURE 4. In a typical arrangement in which the high voltage pulsed stabilising supply PT2 has, for example, a limited current output of 30 amps., the source PS has, for example, an open circuit voltages of 10–15 volts and a low impedance of the order of .01 ohm and serves to fuse short circuits and the source PH has, for example, an open circuit voltage of 100 volts and a current output limited to 10 amps. The stabilising effects of both supplementary sources PS and PH are available continuously to meet demands of the arc. Each of the lower open circuit voltage sources is isolated from the highest open circuit voltage source PH by rectifier device, diodes being connected in series with the source PB of principal background current and the low voltage supplementary source PS and rectifiers connected to the output tappings of the transformer supplying pulsed current sources PT1 and PT2 serving to isolate the latter.

I claim:

1. A D.C. arc welding system having a compound power source including:
   a principal power source having an output which does not fall cyclically to zero, which provides the major part of the arc current and which has an open circuit voltage of the same order as the arc voltage, thereby permitting self-adjusting operation of the arc;
   a supplementary power source having an output voltage which is continuously available and which is greater than that of the principal power source and a short circuit current output not greater than 50% of that of the principal power source;
   a rectifier connected in series with the principal power source across the arc;
   the supplementary power source being connected in parallel with the series-connected rectifier and principal source across the arc, the rectifier being orientated to prevent current flow from the supplementary power source through the principal power source, whereby the power supplied to the arc is derived, under normal operating conditions, predominantly from the principal power source, but, in response to arc instability, predominantly from the supplementary power source.

2. A system according to claim 1 including a supplementary power source having an open circuit voltage equal to at least twice the open circuit voltage of the principal power source.

3. A D.C. arc welding system having a compound power source including:
   a principal power source having an output which does not fall cyclically to zero, which provides the major part of the arc current and which has an open circuit voltage of the same order as the arc voltage, thereby permitting self-adjusting operation of the arc;
   a supplementary power source having an output voltage which is continuously available and which is greater than that of the principal power source and a short circuit current output not greater than 50% of that of the principal power source;
   a rectifier connected in series with the principal power source across the arc;
   the supplementary power source being connected in parallel with the series-connected rectifier and principal source across the arc and the rectifier being orientated to prevent current flow from the supplementary power source through the principal power source, whereby the power supplied to the arc is derived under normal operating conditions, predominantly from the principal power source but in response to arc instability predominantly from the supplementary power source;
   a further supplementary power source having an open circuit voltage which is low compared with that of the principal source and having a low impedance such that, at short circuit, its output current is materially higher than the output current of the principal source;
   and a rectifier connected in series with the further supplementary source and orientated to prevent the latter drawing current from the higher voltage sources.

4. A system according to claim 3, in which the impedance of the comparatively low voltage supplementary source is such that, at short circuit, the current output of that source is at least three times the value of the average arc current and at least equal to 1000 amps and in which the open circuit voltage of that supplementary source is less than two thirds of that of the principal power source.

5. A system according to claim 3, including inductive means associated with the principal power source and in which the impedance of the comparatively low voltage supplementary source is such that, at short circuit, the current output of that source is at least twice the value of the current from the principal source for a period up to 10 milliseconds.

6. A D.C. arc welding system having a compound power source including:
   a principal power source having an output which does not fall cyclically to zero, which provides the major part of the arc current and which has an open circuit voltage of the same order as the arc voltage, thereby permitting self-adjusting operation of the arc;
   a plurality of supplementary power sources having different output voltages and each having an output voltage greater than that of the principal power source and a short circuit current output not greater than 50% of that of the principal power source;
   rectifier means connected in series with each power source except that having the highest open circuit voltage for preventing each source from drawing current from any source having a higher open circuit voltage;
   each supplementary power source being connected in parallel with the principal power source and its series-connected rectifier means across the arc, whereby the power supplied to the arc is derived, under normal operating conditions, predominantly from the principal power source but, in response to arc instability, predominantly from the supplementary power sources.

7. A pulsed current arc welding system having a compound power source including:
   a principal power source providing a steady background current on which are superimposed cyclically repeated pulses of current, the principal power source providing the major part of the arc current and having an open circuit voltage not greatly in excess of the arc voltage;
   a supplementary power source having an open circuit voltage greater than that of the pulses of the principal power source, the supplementary source supplying output current pulses with the same repetition frequency as the output pulses of the principal source but phase shifted with respect to the pulses of the principal source so that they overlap the trailing edges of corresponding pulses of the principal source;
   a rectifier connected in series with the prinpical power source across the arc;
   the supplementary power source being connected in parallel with the series-connected rectifier and principal source across the arc, the rectifier being orientated to prevent current flow from the supplementary power source through the principal power source.

8. A system according to claim 7, in which the duration of each of the pulses from the supplementary pulsed current source is equal to at least one millisecond.

9. A D.C. arc welding system having a compound power source including:
   a principal power source having an output which does not fall cyclically to zero, which provides the major part of the arc current and which has an open circuit voltage of the same order as the arc voltage, thereby permitting self-adjusting operation of the arc;
   a supplementary power source having an output voltage greater than that of the principal power source and a short circuit current output not greater than 50% of that of the principal power source;
   a rectifier connected in series with the principal power source across the arc;
   the supplementary power source being connected in parallel with the series-connected rectifier and the principal source across the arc, the rectifier being orientated to prevent current flow from the supplementary power source through the principal power source;

a second supplementary power source having an open circuit voltage less than two-thirds of that of the principal power source and having a low impedance such that at short circuit its output current is at least three times the value of the average arc current and at least equal to 1,000 amps;

and a second rectifier connected in series with the second supplementary source to prevent the latter from drawing current from the principal and first supplementary sources.

References Cited
UNITED STATES PATENTS

| | | | |
|---|---|---|---|
| 2,834,917 | 5/1958 | Moignet | 315—171 |
| 3,052,817 | 9/1962 | Branker | 315—227.1 |
| 3,365,564 | 1/1968 | Boughton | 315—171 |
| 2,777,973 | 1/1957 | Steele et al. | 315—171 |
| 3,051,828 | 8/1962 | Manz | 315—171 |

JOHN W. HUCKERT, *Primary Examiner.*

H. J. JAMES, *Assistant Examiner.*

U.S. Cl. X.R.

219—131; 315—175, 176, 227